United States Patent [19]

Hiroshige

[11] Patent Number: 5,746,449
[45] Date of Patent: May 5, 1998

[54] SHOCK ABSORBING COVER FOR SEAT BELT ANCHOR

[75] Inventor: Atsushi Hiroshige, Susono, Japan

[73] Assignee: Toyota Jidosha Kabushiki Kaisha, Toyota, Japan

[21] Appl. No.: 724,252

[22] Filed: Sep. 30, 1996

[30] Foreign Application Priority Data

Oct. 5, 1995 [JP] Japan .................................. 7-259060
Jul. 30, 1996 [JP] Japan .................................. 8-200577

[51] Int. Cl.[6] .......................... B60R 22/18; B60R 22/28
[52] U.S. Cl. .......................... 280/808; 297/482
[58] Field of Search .................. 280/808, 801.1, 280/805, 751; 297/482, 483, 468, 471

[56] References Cited

U.S. PATENT DOCUMENTS

| | | | |
|---|---|---|---|
| 3,883,053 | 5/1975 | Pritchard et al. | 297/483 |
| 4,600,217 | 7/1986 | Naumann et al. | 280/808 |
| 5,529,344 | 6/1996 | Yasui et al. | 280/808 |
| 5,685,566 | 11/1997 | Hirase et al. | 280/808 |

FOREIGN PATENT DOCUMENTS 411 979  2/1991  European Pat. Off. .

*Primary Examiner*—Peter C. English
*Attorney, Agent, or Firm*—Cushman, Darby & Cushman IP Group of Pillsbury Madison & Sutro LLP

[57] ABSTRACT

A seat belt device for a vehicle which improves shock absorbing force without reducing a space of an interior of a vehicle. An anchor upper cover of a slip joint is formed in the shape of a disk with an outer side thereof in a transverse direction of the vehicle being opened, and has a structure including a first wall which covers a head portion of an anchor bolt and including a second wall which faces the first wall in such a manner as to be disposed further toward the interior of the vehicle than the first wall with a sealed space of a predetermined width between the first wall and the second wall. A space formed between the first wall and the second wall is filled with a fluid having a low volume change, for example, water, oil or the like.

17 Claims, 10 Drawing Sheets

FIG. 8
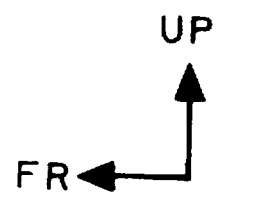
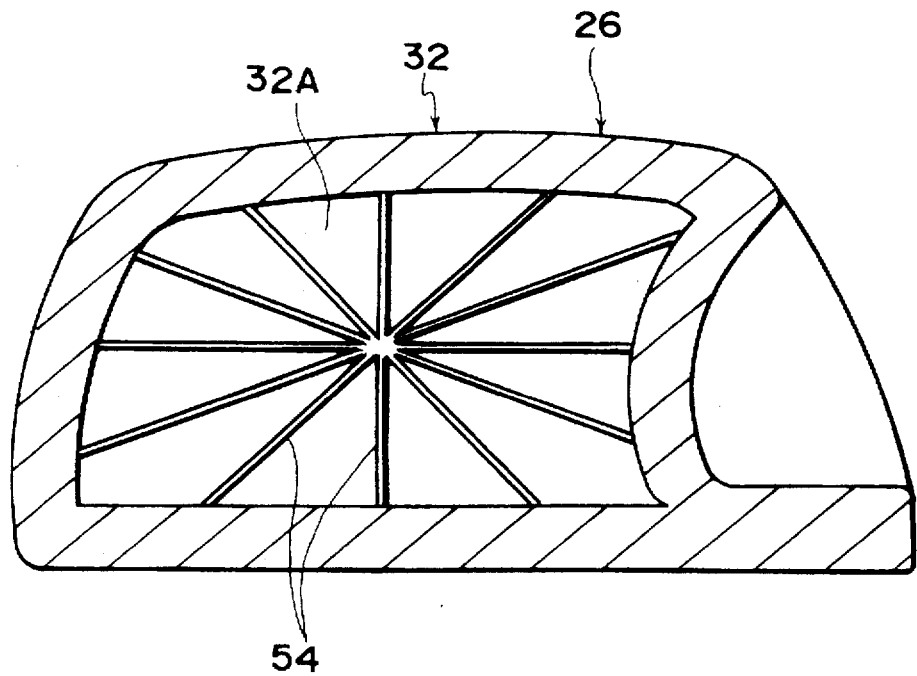

SHOCK ABSORBING COVER FOR SEAT BELT ANCHOR

BACKGROUND OF THE INVENTION

1. Field of the Invention

The present invention relates to a seat belt device for a vehicle, and particularly to a seat belt device for a vehicle in which a seat belt anchor is mounted to a vehicle by a bolt.

2. Description of the Related Art

Conventionally, in a seat belt device installed on a vehicle such as an automobile, an upper portion of a seat belt anchor is mounted to a side wall of a center pillar by a bolt and a through hole in which a webbing is inserted is formed in a lower portion of the seat belt anchor. Further, the upper portion of the seat belt anchor is covered by a cover.

However, in this seat belt device for a vehicle, a shock absorbing member such as a urethane pad, having a shock absorbing stroke of approximately 50% to 70% of its overall thickness, is provided in a space between a bolt and the cover as protection for those situations in which a vehicle occupant abuts against the seat belt anchor due to sudden deceleration of the vehicle or the like. For this reason, it is necessary that the thickness of the shock absorbing member be approximately twice the required shock absorbing stroke. Accordingly, an amount by which the seat belt anchor projects toward an interior of the vehicle becomes large, and a drawback arises in that a space of the interior of the vehicle is reduced.

Meanwhile, as a related art of the present invention, there has been proposed a technique in which incompressible fluid is pushed out toward the vehicle occupant at the time of side collision of the vehicle so as to absorb a shock of the collision, which is described in EP 0 411 979 A2.

SUMMARY OF THE INVENTION

In view of the above-described circumstances, it is an object of the present invention to provide a seat belt device for a vehicle which can improve shock absorbing force without reducing a space of an interior of a vehicle.

The present invention is a seat belt device for a vehicle in which a seat belt anchor is mounted to a vehicle by a bolt, comprising: a cover which covers the bolt and includes a first wall covering a head portion of the bolt, and a second wall disposed with a predetermined space between the first wall and the second wall; and a fluid which is filled in a space between the first wall and the second wall.

According to the present invention, when impact force is applied to the second wall from the interior of the vehicle, the fluid flows and the second wall deforms to conform to the shape of a colliding object. At the same time, impact force is transmitted to the first wall via the fluid. For this reason, pressure applied to the colliding object can be reduced. Further, it is possible to prevent an increase in the amount by which the seat belt anchor projects without a thick shock absorbing member.

In this case, when a convex portion is provided in the first wall at the periphery of the head portion of the bolt so as to have the same height as that of the head portion of the bolt and is disposed to face the seat belt anchor, concentration of reaction force from the head portion of the bolt can be relieved with the convex portion abutting against the seat belt anchor at the time of shock absorbing. For this reason, the first wall can be prevented from being damaged. Further, an inlet opening for the fluid, including a lid portion, is provided in the first wall at the periphery of the head portion of the bolt so as to have the same height as that of the head portion of the bolt. When the inlet opening is disposed to face the seat belt anchor, the lid portion of the inlet opening abuts against the seat belt anchor at the time of shock absorbing, so that the lid portion is difficult to be removed from the inlet opening. As a result, it is possible to prevent the fluid from flowing out from the inlet opening.

Then, by providing a rib on a surface of the second wall at the side of a space in which the fluid is filled, the rigidity of the second wall improves and it is possible to prevent elapsed distortion of the second wall. As a result, there is no possibility that design quality of the second wall deteriorates. Further, when flow resistance of the fluid is increased by the rib, the shock absorbing capacity can be improved.

BRIEF DESCRIPTION OF THE DRAWINGS

FIG. 8 is a cross-sectional view of a seat belt device according to a modified example of the second embodiment of the present invention, which corresponds to FIG. 7.

DESCRIPTION OF THE PREFERRED EMBODIMENTS

A first embodiment of a seat belt device for a vehicle of the present invention will be described hereinafter with reference to FIGS. 1 through 4.

Noted that arrows "FR", "UP", and "IN" shown in the accompanying drawings, respectively represent the forward direction of a vehicle; the upward direction of the vehicle; and an inward direction thereof relative to a transverse axis of the vehicle.

Figure 3:
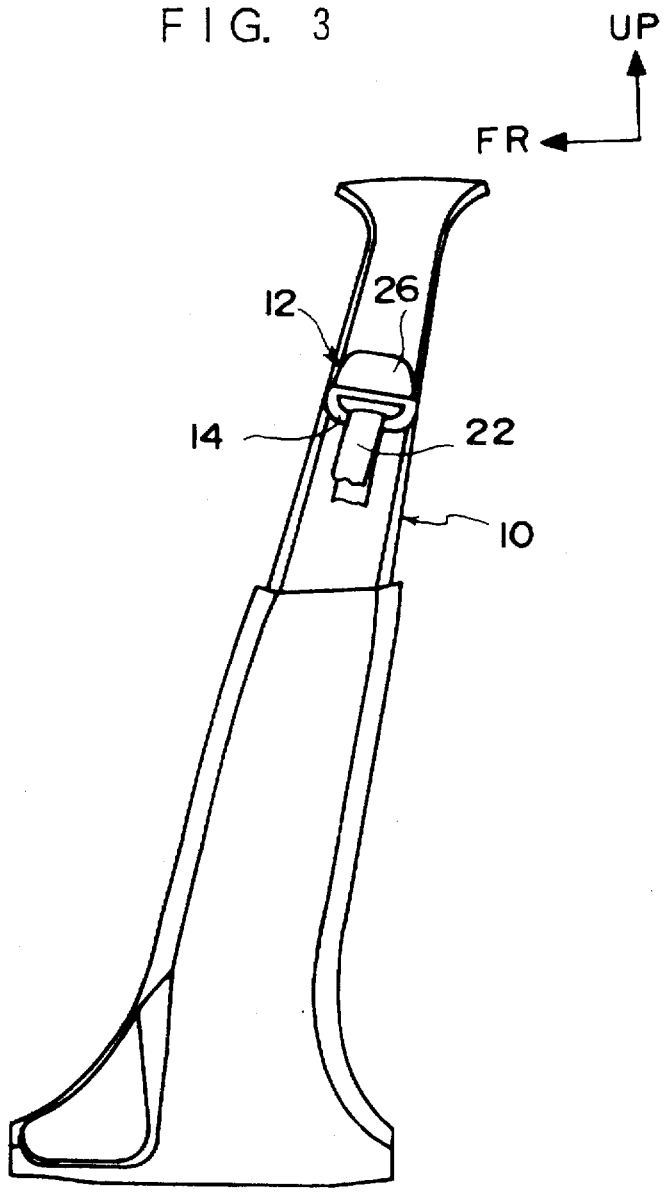
FIG. 3 is a schematic side view showing a center pillar to which the seat belt device for a vehicle according to the first embodiment of the present invention is applied.

As shown in FIG. 3, in the seat belt device for a vehicle according to the first embodiment, a slip joint 12 is provided in an upper portion of a center pillar 10 of the vehicle at an interior side of the vehicle and an intermediate portion of a webbing 22 is provided to pass through a seat belt anchor 14 and to be folded back.

Figure 2:
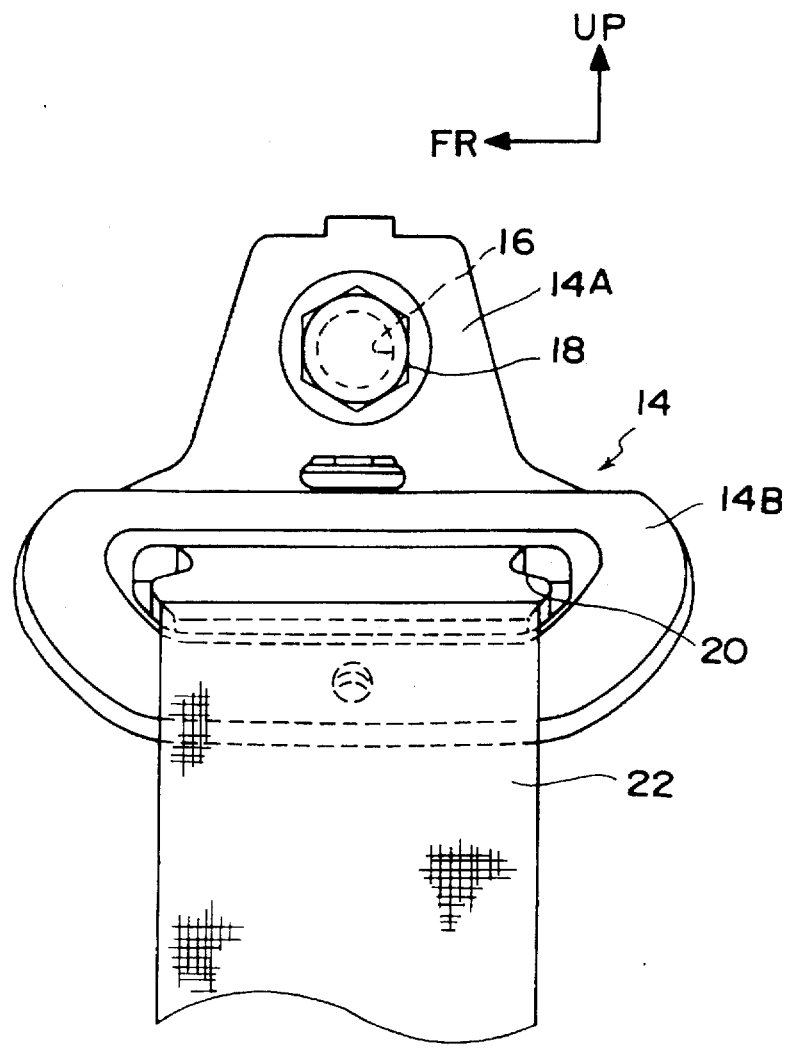
FIG. 2 is a plan view showing a seat belt anchor of the seat belt device for a vehicle according to the first embodiment of the present invention.

As shown in FIG. 2, a mounting hole 16 is formed in an upper portion 14A of the seat belt anchor 14. An anchor bolt 18 which is a shoulder bolt is inserted into the mounting hole 16 and the seat belt anchor 14 is rotatably mounted to the center pillar 10 by the anchor bolt 18. Further, a slit hole 20 which is elongated in a longitudinal direction of the vehicle is formed in a lower portion 14B of the seat belt anchor 14 and the intermediate portion of the webbing 22 passes through the slit hole 20.

Figure 1:
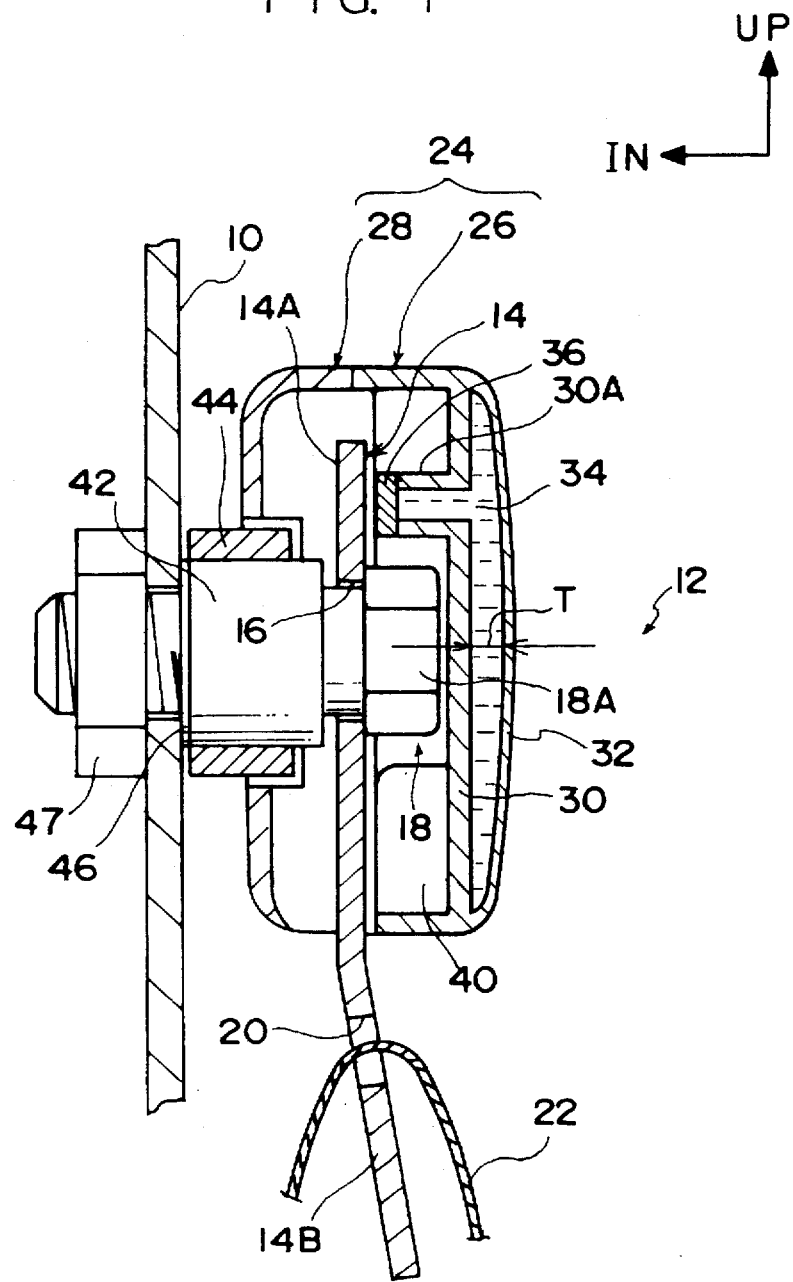
FIG. 1 is a schematic side cross-sectional view showing a seat belt device for a vehicle according to a first embodiment of the present invention.

As shown in FIG. 1, an anchor cover 24 is provided so as to cover the upper portion 14A of the seat belt anchor 14. The anchor cover 24 is formed by an anchor upper cover 26, which covers a vehicle-inner side of the upper portion 14A of the seat belt anchor 14, and an anchor lower cover 28, which covers a center-pillar side of the upper portion 14A of the seat belt anchor 14. The anchor upper cover 26 and the anchor lower cover 28 are engaged with each other by an unillustrated engaging portion and are mounted to the upper portion 14A of the seat belt anchor 14.

The anchor upper cover 26 is formed in the shape of a disk in which an outer side thereof in a transverse direction of the vehicle is opened. The anchor upper cover 26 has a structure including a first wall 30 which faces a head portion 18A of the anchor bolt 18 and including a second wall 32 which faces the first wall 30 in such a manner as to be disposed further toward the interior of the vehicle than the first wall 30 with a sealed space of a predetermined width being formed between the first wall 30 and the second wall 32. A sealed space formed between the first wall 30 and the second wall 32 is filled with a fluid 34 having a low volume change, for example, water, silicone oil, non-freezing solution, or the like.

The first wall 30 includes a gate 30A, serving as an inlet opening, which is formed in a portion thereof at a periphery of the head portion 18A of the anchor bolt 18 in such a manner as to face the upper portion 14A of the seat belt anchor 14. The fluid 34 having a low volume change can be supplied from the gate 30A. Meanwhile, the gate 30A is closed by a lid portion 36 and the height of the gate 30A including the lid portion 36 is set equal to that of the head portion 18A of the anchor bolt 18.

A plurality of convex portions 40 are formed in the first wall 30 at the periphery of the head portion 18A of the anchor bolt 18 in such a manner as to project toward the seat belt anchor 14. The height of each of the convex portions 40 is set equal to that of the head portion 18A of the anchor bolt 18.

Figure 4:
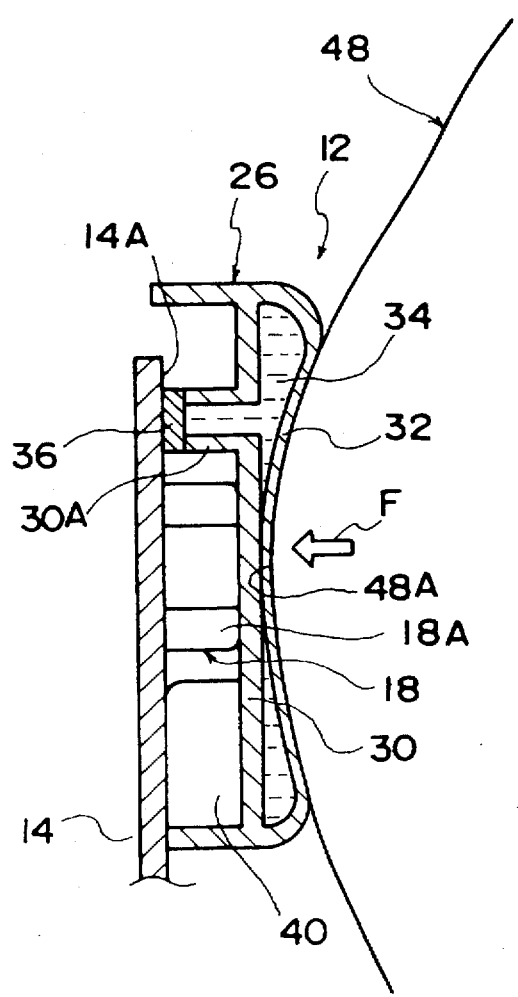
FIG. 4 is an operational diagram of the seat belt device for a vehicle according to the first embodiment of the present invention.

Accordingly, as shown in FIG. 4, when impact force from the interior of the vehicle (indicated by arrow F) is applied to the anchor upper cover 26, these convex portions 40 and the lid portion 36 are adapted to abut against the upper portion 14A of the seat belt anchor 14.

It should be noted that, in FIG. 1, numerals 42, 44, 46 and 47 designate a spacer, a sleeve, a washer, and a nut, respectively.

Next, an operation of the first embodiment will be described.

In the seat belt device for a vehicle according to the first embodiment, as shown in FIG. 4, when a vehicle occupant 48 abuts against the second wall 32 of the anchor upper cover 26 and impact force from the interior of the vehicle (indicated by arrow F in FIG. 4) is applied to the second wall 32, the fluid 34 having a low volume change flows so that the second wall 32 deforms to conform to the shape of an abutment portion 48A of the vehicle occupant 48 and pressure applied to the abutment portion 48A of the vehicle occupant 48 is reduced. Moreover, the impact force is transmitted to the first wall 30 via the fluid 34 having a low volume change.

At this time, since the second wall 32 can deform until the second wall 32 reaches a position where it abuts against the first wall 30, all of the thickness T (see FIG. 1) of the space formed between the first wall 30 and the second wall 32 can be used as a shock absorbing stroke.

Accordingly, in the seat belt device for a vehicle according to the first embodiment, as compared with a device in which a shock absorbing member such as a urethane pad is used in a conventional manner, the thickness of the slip joint becomes small, thereby making it possible to improve shock absorbing capabilities without reducing the space of the interior of the vehicle.

Further, with the above-described structure, when impact force from the interior of the vehicle (indicated by arrow F in FIG. 4) is applied to the second wall 32, the convex portions 40 and the lid portion 36 abut against the upper portion 14A of the seat belt anchor 14 to prevent damage of the second wall 32 which is caused by stress concentration of the head portion 18A of the anchor bolt 18. Further, the lid portion 36 is difficult to be removed from the gate 30A and the fluid 34 can be prevented from flowing out from the gate 30A.

Figure 5:
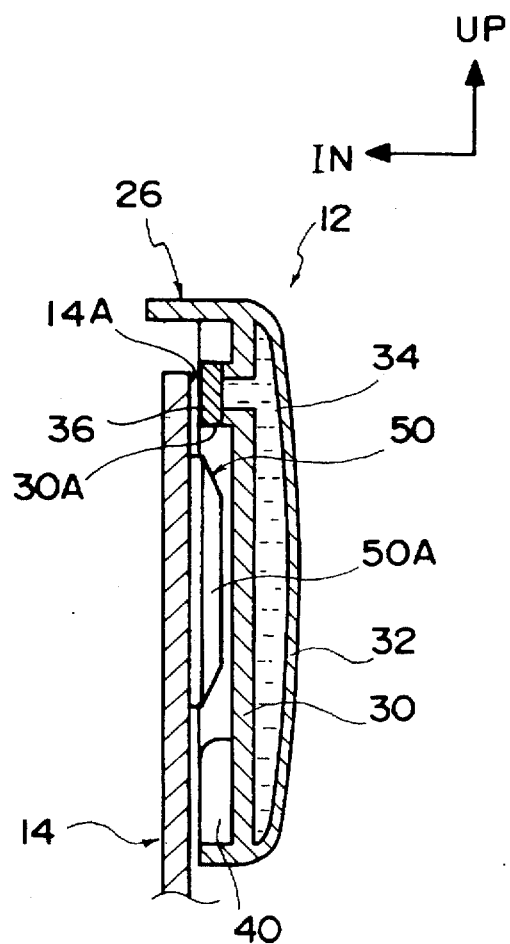
FIG. 5 is a schematic side cross-sectional view showing a portion of a seat belt device for a vehicle according to a modified example of the first embodiment of the present invention.

Meanwhile, the seat belt device for a vehicle according to the present invention can be, as shown in FIG. 5, applied to a slip joint 12 in which an anchor bolt 50 having a thin head portion 50A is used.

Next, a second embodiment of a seat belt device for a vehicle according to the present invention will be described with reference to FIGS. 6 and 7.

It should be noted that the same members as those of the first embodiment will be denoted as the same reference numerals, and a description thereof will be omitted.

Figure 6:
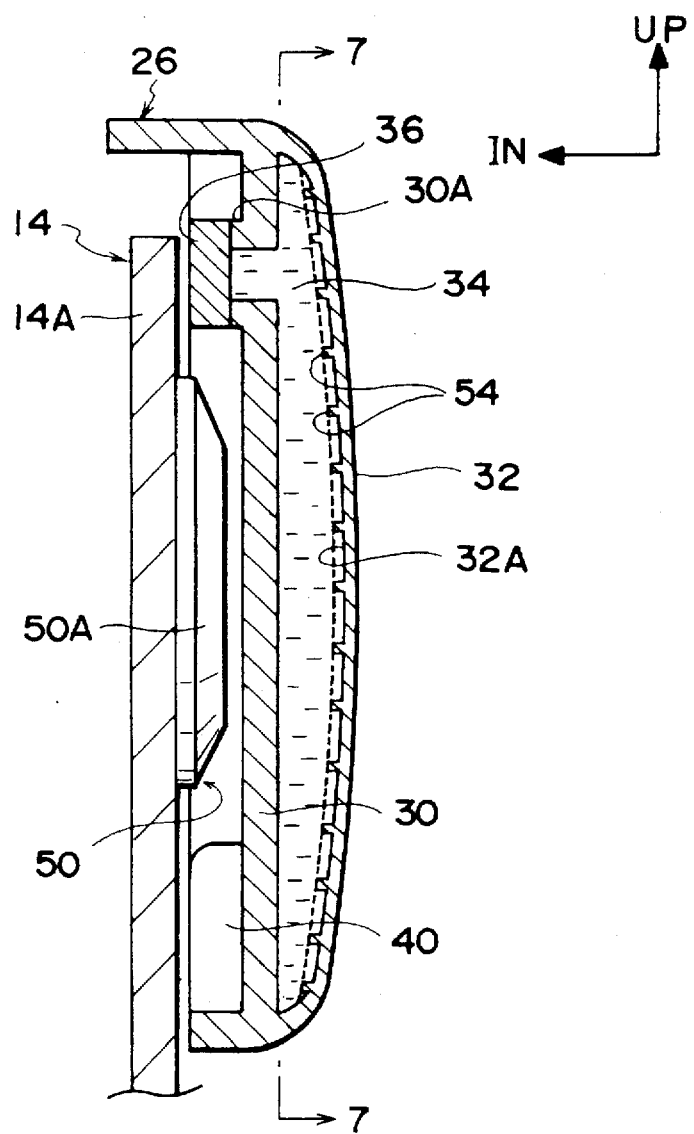
FIG. 6 is a schematic side cross-sectional view showing a portion of a seat belt device for a vehicle according to a second embodiment of the present invention.

As shown in FIG. 6, in the second embodiment, a rib 54 having a rectangular cross-sectional configuration is provided on a wall surface 32A of the second wall 32 which faces a space in which the fluid 34 having a low volume change is filled. The rib 54 is, as shown in FIG. 7, formed to have a lattice-type configuration.

Accordingly, by providing the rib 54 on the wall surface 32A of the second wall 32, the rigidity of the second wall 32 increases and it is possible to prevent elapsed distortion of the second wall 32 which is caused by load of the fluid 34. For this reason, design quality of the second wall 32 does not deteriorate. Further, the rib 54 can cause flow resistance of the fluid 34 to be increased at the time of shock absorbing, and the shock absorbing capacity can be improved accordingly.

Figure 7:
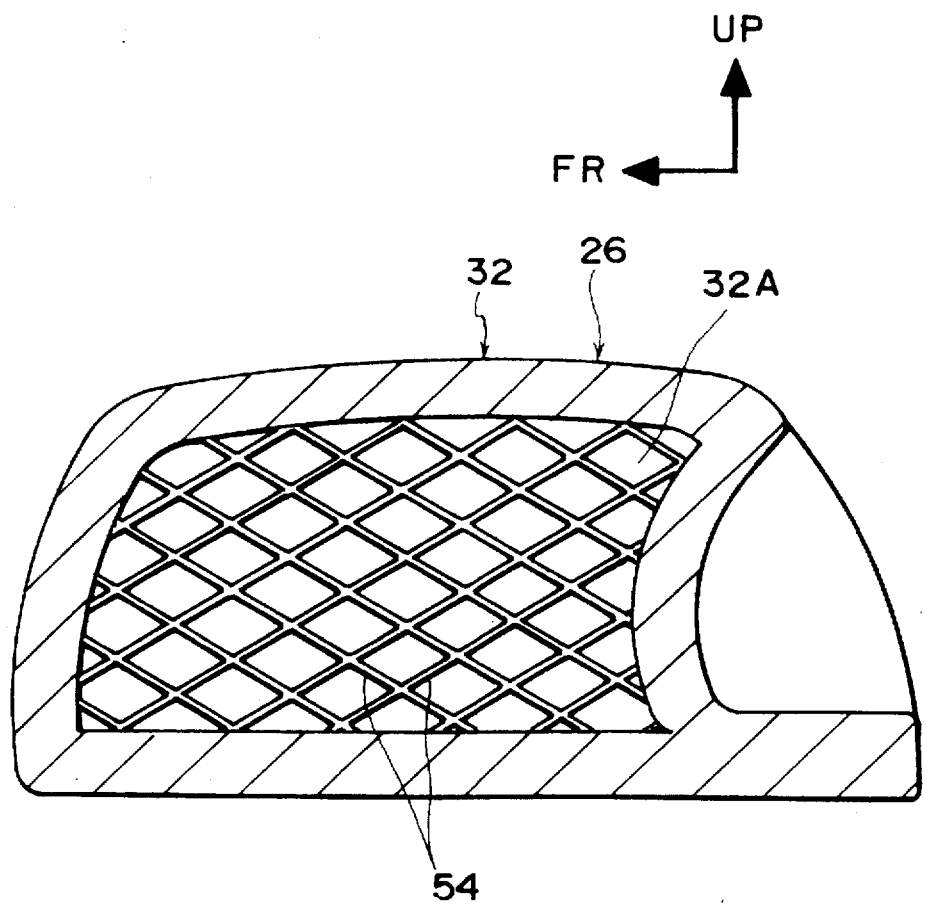
FIG. 7 is a cross-sectional view taken along the line 7—7 in FIG. 6.
Figure 9:
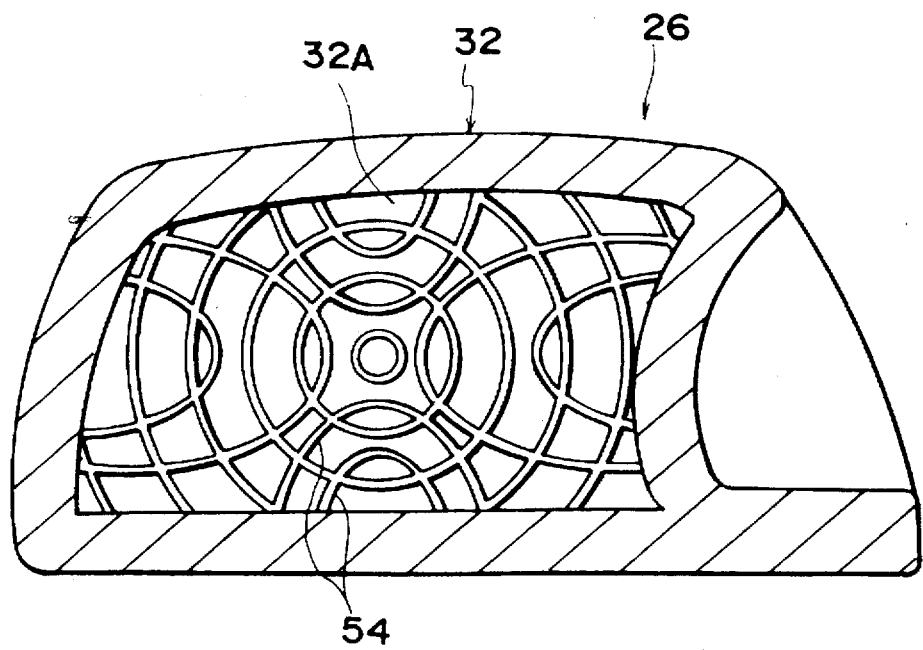
FIG. 9 is a cross-sectional view of a seat belt device according to another modified example of the second embodiment of the present invention, which corresponds to FIG. 7.

Meanwhile, as shown in FIG. 7, the second embodiment is constructed in that the rib 54 is formed to have the lattice-type configuration. However, by considering the rigidity of the second wall 32 and the flow resistance of the fluid 34, the rib 54 may be formed to extend radially as shown in FIG. 8. Further, as shown in FIG. 9, the rib 54 may be formed to have a combination of concentric circles or may be formed to have another configuration of a row type, concentric-circle type, or the like.

Figure 10:
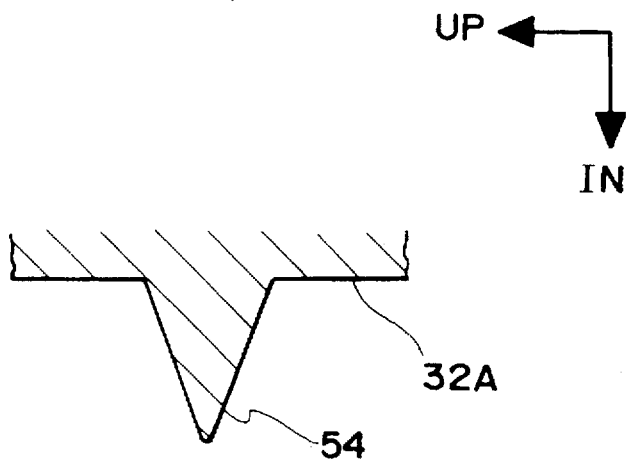
FIG. 10 is a cross-sectional view of a rib of the seat belt device for a vehicle according to a modified example of the second embodiment of the present invention.
Figure 11:
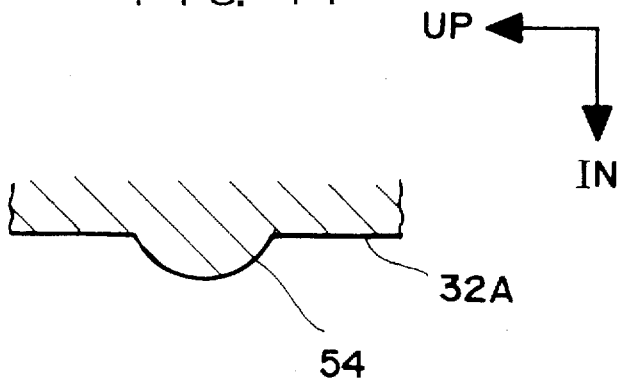
FIG. 11 is a cross-sectional view of a rib of the seat belt device for a vehicle according to another modified example of the second embodiment of the present invention.

Further, in the second embodiment, as shown in FIG. 6, the rib 54 is formed to have a rectangular cross-sectional configuration. However, by considering the flow resistance of the fluid 34, the rib 54 may be, as shown in FIG. 10, formed to have a triangular cross-sectional configuration. Further, the rib 54 may also be formed to have a semicircular cross-sectional configuration or the like, which is shown in FIG. 11.

In the foregoing, the present invention was described with reference to the specified embodiments, but is not limited to the same. It will be obvious to those skilled in the art that other various embodiments may be made without departing from the scope of the invention as hereinafter claimed.

Further, in the above embodiments, a three point-type seat belt device was described. However, the present invention is not limited to the same and is also not limited to a vehicle front seat, a vehicle rear seat, and the like. Moreover, the seat belt anchor may be provided in that the height thereof can be adjusted in accordance with the size of a vehicle occupant in such a manner as to be movable up and down along the vertical direction of the vehicle.

What is claimed is:

1. A shock absorbing seat belt device for a seat belt anchor mounted to a vehicle by a bolt, comprising:

a cover which covers the bolt and includes a first wall covering a head portion of the bolt, and a second wall disposed adjacent to said first wall such that a predetermined space is defined between said first wall and said second wall; and a fluid filled in said space between said first wall and said second wall, wherein said second wall is constructed and arranged to deform along a configuration of an object colliding with said second wall.

2. A seat belt device for a seat belt anchor according to claim 1, wherein said space is tightly sealed by said first wall and said second wall.

3. A seat belt device for a seat belt anchor according to claim 1, wherein said fluid is at least one of water, silicone oil, and non-freezing solution.

4. A seat belt device for a seat belt anchor according to claim 1, wherein a convex portion whose height is set equal to that of the head portion of the bolt is provided in the first wall at a periphery of the head portion of the bolt, and the convex portion is disposed to face the seat belt anchor.

5. A seat belt device for a seat belt anchor according to claim 4, wherein the convex portion is provided in plural and the plurality of convex portions have substantially the same heights.

6. A seat belt device for a seat belt anchor according to claim 5, wherein an inlet opening for said fluid, including a lid portion, is formed in said first wall at a periphery of the head portion of the bolt so as to have the same height as that of the head portion of the bolt, and the inlet opening is disposed to face the seat belt anchor.

7. A seat belt device for a seat belt anchor according to claim 6, wherein said lid portion and said plurality of convex portions abut against said seat belt anchor when impact force is applied to said second wall.

8. A seat belt device for a seat belt anchor according to claim 1, wherein a rib is formed on a wall surface of said second wall at a side of said second wall facing said fluid.

9. A seat belt device for a seat belt anchor according to claim 8, wherein said rib is provided to increase flow resistance of said fluid.

10. A shock absorbing seat belt device for a seat belt anchor mounted to a vehicle by a bolt, comprising:

a cover which covers the bolt and includes a first wall covering a head portion of the bolt, and a second wall disposed adjacent to said first wall such that a predetermined space is defined between said first wall and said second wall; and a fluid sealed within said space between said first wall and said second wall.

11. A seat belt device for a seat belt anchor according to claim 10, wherein said fluid is one of water, silicone oil and a non-freezing solution.

12. A seat belt device for a seat belt anchor according to claim 10, wherein said second wall is deformable.

13. A seat belt device for a seat belt anchor according to claim 10, wherein a convex portion having a height set equal to a height of the head portion of the bolt is disposed on the first wall at a periphery of the head portion of the bolt such that the convex portion faces the seat belt anchor.

14. A seat belt device for a seat belt anchor according to claim 10, wherein a plurality of convex portions are provided, said plurality of convex portions have substantially the same height.

15. A seat belt device for a seat belt anchor according to claim 14, wherein said plurality of convex portions abut against said seat belt anchor when an impact force is applied to said second wall.

16. A seat belt device for a seat belt anchor according to claim 10, wherein a rib is disposed on a wall surface of said second wall at a side of said second wall facing said fluid.

17. A seat belt device for a seat belt anchor according to claim 16, wherein said rib increases flow resistance of said fluid.

* * * * *